UNITED STATES PATENT OFFICE.

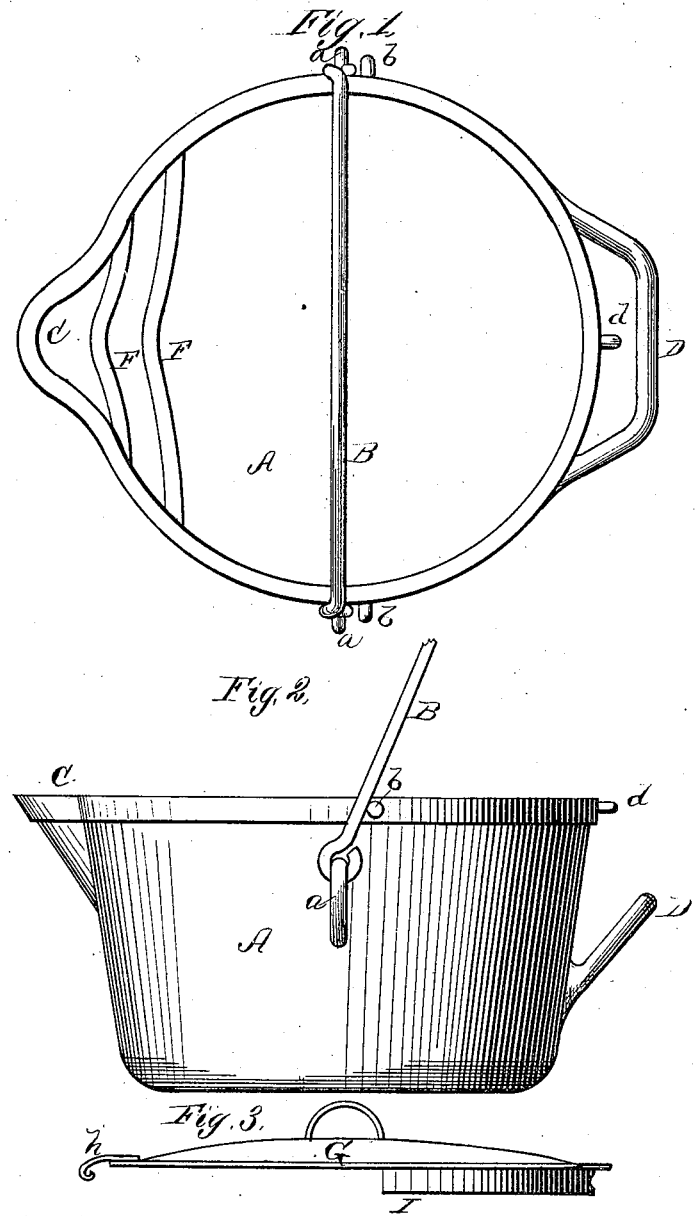

HENRY C. McLEAN, OF LOWELL, MICHIGAN.

IMPROVEMENT IN KETTLES.

Specification forming part of Letters Patent No. 212,483, dated February 18, 1879; application filed January 15, 1879.

*To all whom it may concern:*

Be it known that I, HENRY C. MCLEAN, of Lowell, in the county of Kent and State of Michigan, have invented certain new and useful Improvements in Kettles; and I do hereby declare that the following is a full, clear, and exact description thereof, reference being had to the accompanying drawings, and to the letters of reference marked thereon, which form part of this specification.

The nature of my invention consists in the construction and arrangement of a pot or kettle, and cover for the same, as will be hereinafter more fully set forth.

In order to enable others skilled in the art to which my invention appertains to make and use the same, I will now proceed to describe its construction and operation, referring to the annexed drawings, in which—

Figure 1 is a plan view of the pot or kettle with the cover removed. Fig. 2 is a side view of the same. Fig. 3 is a side view of the cover.

A represents a pot or kettle, of any suitable dimensions, and provided with the usual bail B, hinged to ears $a\ a$ on the sides of the pot or kettle.

The pot or kettle A is cast with a spout, C, and with a handle, D, on opposite sides, said spout and handle being on a line at right angles to the bail, as shown, and the handle projecting from the side of the kettle at an angle of about forty-five degrees, so as to be conveniently grasped in lifting, or in aiding to lift, the pot or kettle from the stove, and in pouring out the liquid.

Across the top of the kettle, at the front— that is, the side where the spout is—are two or more cross-bars, F F, according to the size of the pot or kettle, to hold back the solid contents while the liquid is being poured out.

Above and back of the bail-ears $a\ a$, on each side of the pot or kettle A, projects a lug or pin, $b$, and these pins or lugs act as stops for the bail, so that, in tilting the pot or kettle for pouring out, the bail can only come to about an angle of forty-five degrees, which prevents accidents oftentimes occurring when tilting too far. By the means of these pins or lugs the bail at that point becomes, as it were, rigid, and cannot go any farther back.

Above the handle D, from the rim of the kettle or pot, projects another pin or lug, $d$, for a purpose that will be hereinafter described.

G represents the cover, which is provided with a downwardly-projecting flange, I, extending around the back of the cover from the lug $b$ on one side of the pot or kettle to the corresponding lug on the opposite side.

In the center of the flange I is made a hole to fit over the lug $d$, as shown.

At the front of the cover is a catch, $h$, which binds on the center of the front cross-bar, F, to prevent the cover from slipping backward, the rear lug, $d$, preventing the cover from coming off.

The top of the spout C is left uncovered for the escape of steam.

Having thus fully described my invention, what I claim as new, and desire to secure by Letters Patent, is—

1. As a new article of manufacture, a pot or kettle, A, provided with hinged bail B, spout C, inclined handle D, cross-bars F, and lugs $b$, all substantially as and for the purposes herein set forth.

2. In combination with a pot or kettle, A, having a lug, $d$, projecting from its rim, the cover G, provided with the rim or flange I, passing around about one-half of the kettle, and having a central hole, substantially as and for the purposes herein set forth.

3. The cover G, provided with the rear flange, I, having central hole, and with the front catch, $h$, in combination with a pot or kettle having rear lug, $d$, and one or more front cross-bars, F, substantially as and for the purposes herein set forth.

In testimony that I claim the foregoing as my own I affix my signature in presence of two witnesses.

HENRY C. McLEAN.

Witnesses:
   CHAUNCEY C. JENCKS,
   ALEXANDER McLEAN.